Jan. 5, 1943. O. F. CULLERTON 2,307,200
SWIVEL ASSEMBLY FOR FISH LURE
Filed April 21, 1941
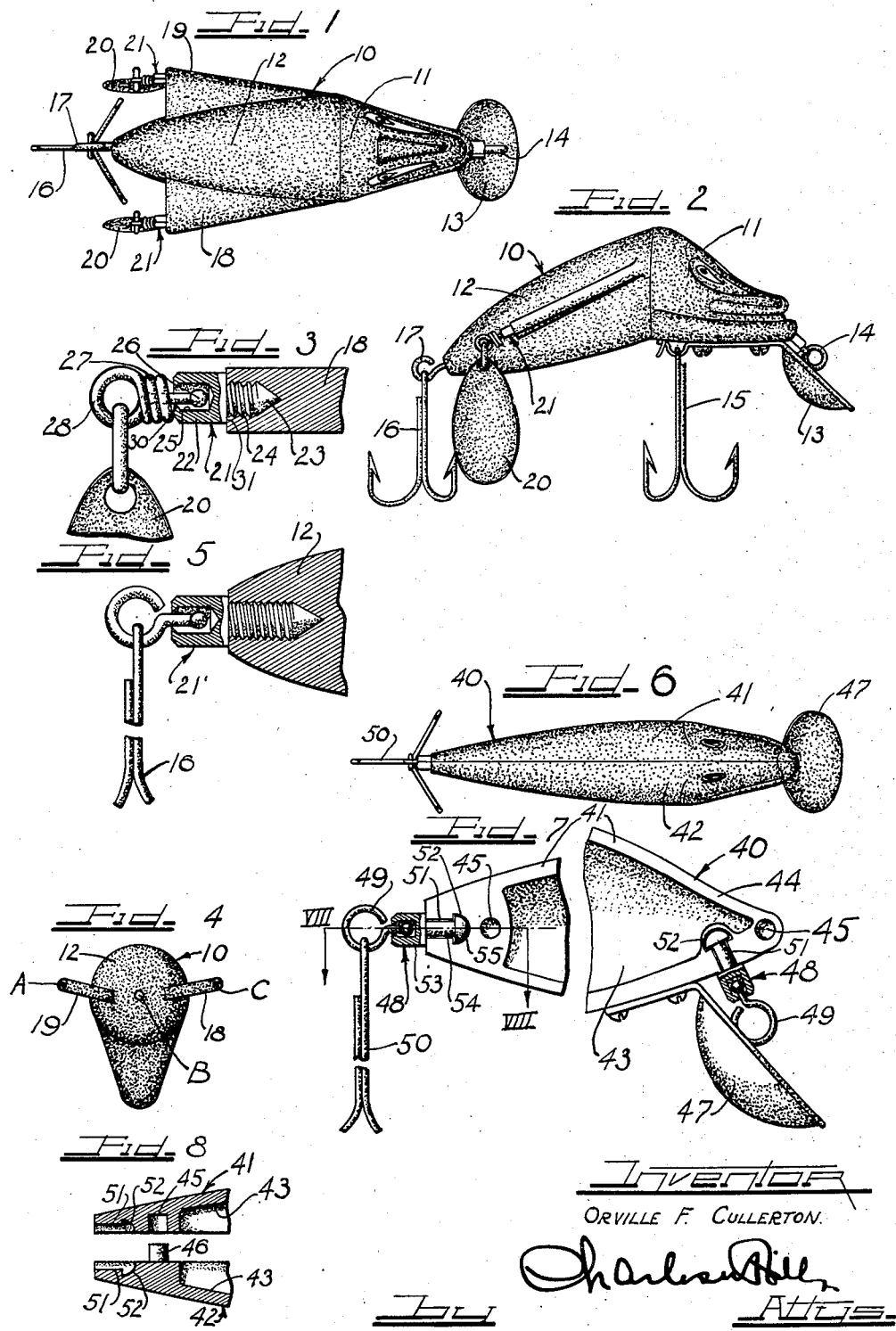
INVENTOR
ORVILLE F. CULLERTON Patented Jan. 5, 1943

2,307,200

UNITED STATES PATENT OFFICE 2,307,200

SWIVEL ASSEMBLY FOR FISH LURES

Orville F. Cullerton, Chicago, Ill., assignor to The W. J. Jamison Company, Chicago, Ill., a co-partnership consisting of Ethel B. Cullerton and Orville F. Cullerton Application April 21, 1941, Serial No. 389,510

2 Claims. (Cl. 43—46)

This invention relates to a swivel assembly especially adapted for use with a fish lure. More specifically, this invention relates to swivel assemblies composed of one-piece metallic members having reduced ends adapted for securing the assemblies to a body such as a fish lure and having other ends provided with a socket for receiving the ball-shaped end of a swivel element.

This application is a continuation-in-part of my copending application entitled "Fish lure," filed August 3, 1940, Serial No. 350,792, since issued as Patent No. 2,241,767, May 13, 1941.

An object of the invention is to provide a more economical way of attaching an element to be whirled or swiveled to an object such as a fish lure.

Another object of the invention is to provide an improved swivel assembly especially adapted for use in fish lures, and which may be very economically manufactured on a large scale production basis.

A specific object of the invention is to provide a swivel assembly having a threaded end adapted to be screwed into the body of a fish lure.

A further specific object of this invention is to provide a swivel assembly having an extending headed shank portion adapted to be seated in a headed recess of a fish lure.

In accordance with the general features of this invention, there is provided a novel swivel assembly especially adapted for use in fish lures which includes a single piece socket member having one end formed with a conical head and threaded so as to be adapted to be screwed into a body such as a plastic body of a fish lure, and having its other end provided with a socket, the outer extremity of which is turned inwardly to retain the inserted or ball end of a swivel element in the socket. Alternatively, the conical head and threaded end of the socket member can be replaced with a cylindrical shank having an enlarged head on the free end thereof for seating in the headed recess of the plastic body of a fish lure.

Still another feature of the invention relates to the formation of mating complementary headed depressions in half portions of fish lure bodies for receiving the headed shank portion of a swivel element to fixedly retain the swivel element when the sections of the plastic body are united.

Other objects and features of the invention will more fully appear from the following detailed description taken in connection with the accompanying drawing which illustrates several preferred embodiments of the invention, and in which:

Figure 1 is a plan view of a fish lure equipped with swivel elements according to this invention;

Figure 2 is a side view of the lure shown in Figure 1;

Figure 3 is an enlarged fragmentary cross sectional view taken through one of the fins of the lure shown in Figures 1 and 2, and showing the use of the socket assembly for attaching a spinner to the rear extremity of the fin;

Figure 4 is a rear view of the lure shown in Figures 1 and 2, with the swivel connections omitted and showing the holes into each of which the socket members of the novel assemblies are adapted to be screw threaded;

Figure 5 is an enlarged cross sectional view similar to Figure 3 but showing the tail end of the lure provided with the novel socket assembly for connecting a tandem hook thereto;

Figure 6 is a plan view of a plastic fish lure composed of two mating half sections and equipped with modified forms of swivel assemblies according to this invention;

Figure 7 is a broken inside elevational view, with parts broken away and shown in vertical cross section, of one of the half sections of the lure shown in Figure 6 and illustrating the manner in which the swivel sockets are attached to the lure body; and Figure 8 is a cross sectional view, with parts omitted, taken along the line VIII—VIII of Figure 7 and illustrating the two half sections of the lure body cooperating to retain the socket assembly.

As shown on the drawing:

The reference character 10 designates generally a plastic or wood body of a fish lure, which may be of any suitable construction or fabrication, as long as it embodies the features of this invention. As illustrated, the body 10 is in the form of a wiggler including a head portion 11 and a tail portion 12 which are integral. The head portion 11 includes the usual head plate or spoon 13 fastened to the under side of the lure. This spoon is made of metal and is of a construction that is well known to those familiar with this art. Attached to the head portion 11 above the spoon 13 is an eyelet 14 by means of which the lure is attached to a fishing line. This eyelet 14 may, if it is so desired, be connected to the body of the lure by means of the novel swivel assembly which will be hereinafter more fully described in connection with spinners and hooks. In other words, if it is so desired, the eyelet 14 may be fastened to the head portion 11 so as to have a swivel connection therewith.

Depending from, and fastened to the under side of the head portion 11 is a gang hook 15 of conventional construction. Attached to the rear end of the tail portion 12 is another gang hook 16, which is fastened by means of an eyelet 17 to the rear extremity of the tail portion 12. As will be further described in connection with Figure 5, this gang hook 16 may also be connected to the body of the lure by means of the swivel assembly which shall be described particularly in connection with spinners.

The tail portion 12 is provided with oppositely disposed lateral fins 18 and 19, each of which is of triangular shape, and has connected to its rear end, or, in other words, to the base of the triangle, a spinner 20. Each of these spinners is connected to the corresponding fin by means of a swivel assembly designated generally by the reference character 21 and embodying features of this invention.

The fins 18 and 19 are so arranged as to enable a balanced construction, as well as to provide moorings for the associated spinners. Also, it will be noted from Figure 4 that each of the fins 18 and 19 is slightly inclined relative to the horizontal.

In Figure 3, there is illustrated the details of the swivel assembly. This assembly includes a socket member 22 having one end formed with a conical tip 23 and threaded as indicated at 24. This threaded end of the member 22 is adapted to be screwed into an unthreaded smaller hole previously formed in the associated part of the fish lure body. In Figure 4, there is indicated three such holes A, B, and C, into each of which the threaded end of a socket member is adapted to be screwed. The arrangement is such that the threads 24 on the socket member 22 tap the corresponding hole in the fish lure body as the socket member is screwed therein.

The other end of the socket member 22 is provided with a socket or bore 25, which may be of cylindrical formation. Disposed in this socket 25 is the ball end 26 of an eyelet element 27 having an eyelet 28 formed on its external or outer end. It is to this eyelet 28 that the spinner 20 is connected as shown in Figure 3.

The ball end 26 of the eyelet element is held in the socket by means of a turned-in edge 30 formed on the outer end of the socket member 22. This construction is such that the ball end may be first inserted in the socket and thereafter the edge of the socket may be spun or turned to form the turned edge 30.

It will also be noted that the socket member 22 has a shoulder 31 between the socket portion and the threaded portion 24. This shoulder is adapted to abut the surface of the body when the threaded end 24 is screwed into position in the hole in the lure body.

Thus there is provided an economical socket assembly in which the principal socket member is formed of a single piece of metal and may be economically manufactured on a large production basis.

In Figure 5, there is illustrated substantially the same socket assembly 21' for swivelly connecting the gang hook 16 to the rear end of the tail portion 12 of the fish lure. Since this swivel or socket assembly is substantially the same as the assembly 21 previously described, no further detailed description of it is thought necessary.

An alternative swivel assembly according to this invention especially adapted for use with split molded fish lure bodies is shown in Figures 6 to 8. In these figures, the reference character 40 designates generally a molded plastic body of a fish lure composed of complementary longitudinal half sections 41 and 42, each of which may have a hollow cavity or chamber 43 therein bounded by flat mating faces 44. The face 44 of one mating half section, such as the section 41 shown in Figure 7, has depressions 45 therein, while the face on the other section 42 has pins such as 46 molded thereon adapted to be seated in the depressions 45 as best shown in Figure 8. The two half sections 41 and 42 are adapted to be cemented or otherwise secured together along their faces 44 to provide the full lure body as shown in Figure 6.

The lure 40 preferably has a head plate or spoon 47 secured to the under side of the head thereof. Attached to the head portion of the lure is a swivel assembly 48 carrying an eyelet 49 by means of which the lure is attached to a fishing line.

Depending from and fastened to the rear end of the lure 40 is a gang hook 50 connected to the lure body through a similar swivel 48 and eye 49.

The faces 44 of each half part 41 and 42 of the lure body have semi-cylindrical depressions 52 extending inwardly from the bottom of the head portion and from the rear end of the tail portion of the lure, as shown in Figures 7 and 8. Each of these semi-cylindrical depressions terminates in an enlarged depression 52. When the body portion defining sections 41 and 42 are secured together as shown in Figure 8, the depressions 51 and 52 mate together to form cylindrical recesses with enlarged headed ends.

The swivel assembly 48 is composed of a body member 53 identical with the body member 22 of the swivel assembly 21. However, this body member 53 has a cylindrical shank 54 with an enlarged headed end 55. The shank and head replace the threaded conical end of the swivel assembly 21 described above. The head 55 of the shank is adapted to seat in the enlarged recesses 52 of the half members 41 and 42, while the cylindrical shank portion 54 snugly fits in the cylindrical recesses 51 in the half members. When the half members 41 and 42 are united together, the head 55 of the shank cannot be retracted from the recess 52, and the swivel assembly is thus affixed to the lure body. In assembling the swivel assembly 48 to the lure body, the shank and head are seated in the depressions provided therefor in one half of the lure body. The other half of the lure body is then mounted in place to receive the exposed portion of the shank and head, and the half sections of the body are united by a solvent for the plastic such as acetone, by a cement, or by any other fastening medium or device.

It will, of course, be understood that various details of construction may be varied through a wide range without departing from the principles of the invention, and it is, therefore, not the purpose to limit the patent granted hereon otherwise than necessitated by the scope of the appended claims.

I claim as my invention:

1. In a fish lure, a split body member, including connected complementary sections, said sections having mating faces, each of said sections having a depression in its mating face extending inwardly from the outer surface of the body and terminating in an enlarged depression, said depressions mating when said body sections are connected together to form a channel with an enlarged inner end, a member having an enlarged socket chamber defining head with an abutment shoulder thereon and a shank extending away from said head and terminating in an enlarged portion, said shank being seated in said channel and said enlarged terminal portion of the shank being seated in the enlarged inner end of the channel whereby said enlarged terminal portion and said abutment shoulder coact with the enlarged end of the recess and the outer surface of the body respectively for holding the member in the body member against relative axial movement, and a swivel eyelet having a headed end disposed in said socket chamber, said enlarged head of said member having an edge portion turned inwardly over the socket chamber for holding the headed end of the swivel element in the socket.

2. In a fish lure, a split hollow body member including connected complementary sections, said sections having depressed central portions, marginal edges defining mating faces, mating channels in said marginal edges extending inwardly from the outer surface of the body and terminating in enlarged channel ends spaced from said depressed central portions, a member having an enlarged socket chamber defining head with an abutment shoulder thereon and a shank extending away from said head and terminating in an enlarged portion, said shank being seated in said channels and said enlarged portion of the shank being seated in the enlarged channel ends whereby said enlarged shank portion and said abutment shoulder coact with the body at the ends of the channels for connecting the member to the body member and a swivel element having a headed end seated in said socket chamber in rotatable relation whereby the hollow interior of the body is isolated from the channels to prevent leakage along the shank into the hollow body.

ORVILLE F. CULLERTON.